United States Patent
Comstock

(10) Patent No.: US 6,452,920 B1
(45) Date of Patent: Sep. 17, 2002

(54) MOBILE TERMINATING L2TP USING MOBILE IP DATA

(75) Inventor: David R. Comstock, Solna (SE)

(73) Assignee: Telefonaktiebolaget LM Ericsson (SE)

( * ) Notice: Subject to any disclaimer, the term of this patent is extended or adjusted under 35 U.S.C. 154(b) by 0 days.

(21) Appl. No.: 09/223,187

(22) Filed: Dec. 30, 1998

(51) Int. Cl.$^7$ .............................. H04J 3/24; H04Q 7/22; H04Q 7/38

(52) U.S. Cl. ..................... 370/349; 370/328; 370/389; 370/392; 370/400; 370/466; 370/469; 370/474; 370/900; 370/901

(58) Field of Search ................................ 370/310, 328, 370/331, 351, 352, 389, 392, 400, 401, 465, 466, 469, 474, 901, 902, 912, 913, 349; 379/900, 901

(56) References Cited

U.S. PATENT DOCUMENTS

| | | | |
|---|---|---|---|
| 5,572,528 A | * 11/1996 | Shuen | 370/85.13 |
| 5,918,019 A | * 6/1999 | Valencia | 395/200.57 |
| 6,052,725 A | * 4/2000 | McCann et al. | 709/223 |
| 6,094,437 A | * 7/2000 | Loehndorf, Jr. et al. | 370/420 |
| 6,118,785 A | * 9/2000 | Araujo et al. | 370/401 |
| 6,160,804 A | * 12/2000 | Ahmed et al. | 370/349 |
| 6,256,300 B1 | * 7/2001 | Ahmed et al. | 370/331 |
| 6,298,060 B1 | * 10/2001 | Miyakawa et al. | 370/400 |
| 6,308,213 B1 | * 10/2001 | Valencia | 709/223 |

FOREIGN PATENT DOCUMENTS

EP  0 917 318 A2  5/1999

OTHER PUBLICATIONS

W. Woo and V. Leung. Handoff Enhancement in Mobile–IP Environment. IEEE 1996. pp. 760–764.*
P. Komisarczuk. IP Access Service Provision for Broadband Customers. IEE 1999. pp. 5/1–5/4.*
A. Myles, D. Johnson, and C. Perkins. A Mobile Host Protocol Supporting Route Optimization and Authentication. IEEE Journal on Selected Areas in Communications, vol. 13, No. 5, Jun. 1995. pp. 839–849.*
PPP Working Group, "Layer Two Tunneling Protocol L2TP", Dec. 20, 1998, pp. 1–35.
Charles E. Perkins, Sun Microsystems, "Mobile Networking Terminology", Tutorial: Mobile IP, 1997, pp. 1–3.
Charles E. Perkins, Sun Microsystems, "Mobile Networking Through Mobile IP", Tutorial: Mobile IP, 1997, pp. 1–15.
Charles E. Perkins, Sun Microsystems, "Nomadicity: How Mobility Will Affect The Protocol Stack", Tutorial: Mobile IP, 1997, pp. 1–3.
Microsoft Corporation, "Virtual Private Networking: An Overview", Jun. 25, 1998, pp. 1–19.
Cisco Systems, Inc., "L2TP Questions and Answers" XP–002106954, 1998, pp. 1–7.

(List continued on next page.)

Primary Examiner—Hassan Kizou
Assistant Examiner—Joe Logsdon
(74) Attorney, Agent, or Firm—Burns, Doane, Swecker & Mathis, L.L.P.

(57) ABSTRACT

In accordance with embodiments of the invention, Mobile IP binding information is used to deliver mobile terminating packets using layer-2 tunneling. When terminating packets destined for a mobile node are received by a home network for the mobile node, the Mobile IP binding is used to obtain the address of a foreign network to which the mobile node is attached. A Layer 2 Tunneling Protocol tunnel is created between the home network and the foreign network, and an outgoing L2TP call is made from the home network to the foreign network. A call is made from the foreign network to the mobile node, and a PPP session is established between the home network and the mobile node, via the Layer 2 Tunneling Protocol tunnel between the home network and the foreign network. After the PPP session is established the home network can optionally assign the mobile node a private IP address, and translate the home IP address labeling the terminating packets to the private IP address.

9 Claims, 2 Drawing Sheets

OTHER PUBLICATIONS

Gary C. Kessler, "Mobile IP: Harbinger of Untethered Computing" XP–002106955, Sep. 1998, pp. 1–7.

PPP Working Group, "Layer Two Tunnelling Protocol L2TP" XP–002106956, Oct. 1998, pp. 1–93.

Gary Scott Malkin, "Dial–in Virtual Private Network Using Layer 3 Tunneling", XP–002084438, 1997, pp. 555–561.

Charles E. Perkins, "Mobile Networking Through Mobile IP", XP–000764776, 1998, pp. 58–69.

W.T. Teo and Y. Li, "Mobile IP Extension For Private Internets Support ", XP–002106957, Nov. 1998, pp. 1–22.

Standard Search report dated Jun. 23, 1999.

* cited by examiner

MOBILE TERMINATING L2TP USING MOBILE IP DATA

FIELD OF THE INVENTION

The present invention relates generally to data communications between a host and a mobile node, and in particular to data communications between the host and the mobile node that cross internetworks.

BACKGROUND OF THE INVENTION

The Internet Protocol (IP), the protocol that connects the networks of today's Internet, routes information or data packets to their destinations according to IP addresses. IP addresses are associated with a fixed network location much as a non-mobile phone number is associated with a physical jack in a wall. Thus, when a user of a computer attached to the Internet using the IP changes the computer's point of attachment to the Internet, his computing activities with respect to the Internet are disrupted. This is because each new point of attachment to the Internet is associated with a new network number, and hence, a new IP address. To resume Internet computing activities, the user must typically cause his computer to make a new Internet connection using the new IP address.

Highly portable wireless computing devices offering IP connectivity are becoming increasingly popular. Such devices include, for example, digital cell phones, personal digital assistants (PDA's), electronic pocket organizers, and even laptop computers equipped with interface mechanisms such as a wireless modem or a modem together with a cell phone. For a variety of reasons, a user on the move may have to change his computing device's point of attachment to the Internet. For example, the user's device may travel out of range of a wireless communication node through which the point of attachment was maintained and the link between the computing device and the Internet may be dropped, or long distance cell phone and/or roaming charges associated with maintaining the link may become prohibitive. Accordingly, the concept of mobile networking is becoming increasingly attractive. In mobile networking, computing activities are not disrupted when the user changes his computing device's point of attachment to the Internet. Instead, all the needed reconnection occurs automatically and non-interactively so that it can be transparent to the user.

Mobile IP (RFC 2002) is a standard proposed by a working group within the Internet Engineering Task Force, that was designed to solve the problem of making transparent mobility possible. Principles of Mobile IP are described, for example, in *Mobile Networking Through Mobile IP*, by Charles E. Perkins, copyright 1997 Institute of Electrical and Electronics Engineers, Inc., which is hereby incorporated by reference. Additional terms and principles relating to networking, including Point-to-Point Protocol (PPP) and Layer 2 Tunneling Protocol (L2TP) protocols, are variously described and defined in *Mobile Networking Terminology*, by Charles E. Perkins, copyright 1997 Institute of Electrical and Electronics Engineers, Inc., *Nomadicity: How Mobility Will Affect the Protocol Stack*, by Charles E. Perkins, copyright 1997 Institute of Electrical and Electronics Engineers, Inc., and *Virtual Private Networking: An Overview*, copyright 1998 Microsoft Corporation, all of which are hereby incorporated by reference.

Mobile IP allows a mobile node (such as a user's wireless computing device) to receive data packets by using two IP addresses: a fixed "home" address and a "care-of" address.

The home address designates a home network for the mobile node, to which data for the mobile node can be sent. The home network can be, for example, an operator's network (like an Internet Service Provider, or ISP) or a corporate network.

The care-of address designates a different or "foreign" network to which the mobile node is attached, and to which data packets received by the home network for the mobile node can be forwarded for delivery to the mobile node.

Mobile IP requires the existence of a network node within the home network known as a "home agent", and also a network node within the foreign network known as a "foreign agent". The home agent is a router in the home network that performs the Mobile IP home agent functionality. The foreign agent is a router in the foreign network that performs the Mobile IP foreign agent functionality.

Whenever the mobile node moves, i.e., changes its point of attachment from one foreign network to another foreign network, it "registers" its new care-of address with its home agent. The home agent associates the home address of the mobile node with the current care-of address, and this information together with a lifetime for the registration (e.g., a time period during which the association will be considered valid) forms a "binding" for the mobile node. Thus, when the mobile node changes networks, it registers with the home agent and the home agent updates the binding to reflect the new care-of address.

In operation, the home agent receives all packets addressed to the home address and intended for the mobile node whenever the mobile node is not directly attached to its home network (and is therefore attached to the foreign network). These packets can be referred to as "terminating" packets. The home agent "tunnels" the terminating packets it has received to the foreign agent, which finally transfers them to the mobile node.

In general, tunneling is a method of using an internetwork infrastructure to transfer data from a first network to a second network over an intermediate network. The intermediate network can be of a type that is different from the type of the first and second networks. The data to be transferred (or "payload") can be the frames (or packets) of another protocol. Instead of sending a frame as it is produced by the originating node, the tunneling protocol encapsulates the frame in an additional header. The additional header provides routing information so that the encapsulated payload can traverse the intermediate network. The encapsulated payloads are then routed between tunnel endpoints over the intermediate network or internetwork. The path through which the encapsulated packets travel through the internetwork or intermediate network is called a "tunnel". Once the encapsulated payloads reach their destination on the internetwork, the payloads are unencapsulated and forwarded to their final destination in the second network. Tunneling includes the entire process of encapsulating, transferring, and unencapsulating.

To tunnel terminating packets between the home network and the foreign network in Mobile IP, the home agent modifies each terminating packet so that the care-of address appears as the destination IP address for the terminating packet. This modification can be understood as a packet transformation, or more specifically, as a "redirection". In Mobile IP, the home agent redirects each terminating packet from the home network to the care-of address by constructing a new IP header that contains the mobile node's care-of address as the destination IP address. This new header then shields or encapsulates the original termination packet, including the original IP header, so that the mobile node's home address in the original IP header will have no effect on the encapsulated packet's routing until it arrives at the care-of address.

When the encapsulated terminating packet sent by the home agent is received at the care-of address, e.g., the foreign network to which the mobile node is connected, the foreign agent at the foreign network strips off the header containing the care-of address, thus unencapsulating the terminating packet, and forwards the terminating packet (bearing the home address in its header) to the mobile node. The home address ensures that the terminating packet will be processed properly by TCP or whatever higher level protocol logically receives it from the mobile node's IP (that is, layer-3) processing layer. The default encapsulation mechanism that must be supported by all mobility agents using Mobile IP is IP-within-IP as described above, which is a layer-3 tunnel.

In Mobile IP, as described above, a data packet intended for the mobile node goes to the home agent and then to the foreign agent via a tunnel before it gets to the mobile node. However, the mobile node can send packets directly to the correspondent node without tunneling. This asymmetry is captured by the term "triangle routing", where a single leg of the triangle goes from the mobile node to the correspondent node, and the home agent forms the third vertex controlling the path taken by data flowing from the correspondent node to the mobile node.

In summary, Mobile IP provides a method for layer-3 tunneling from a host to a mobile node. Mobile IP employs triangular routing such that all packets terminating to a mobile node are routed first to a home agent which maintains a data base of a binding between the mobile node's IP address and the address of a foreign agent that the mobile node is attached to. When the mobile node changes networks, this binding is updated to a new foreign host address. To route a terminating packet to the mobile node, the home agent tunnels the packet to the foreign agent using layer-3 tunneling. The foreign host then delivers the packet to the mobile node.

Layer-2 tunneling (as variously described, for example, in *Virtual Private Networking: An Overview*, and in co-pending application Ser. No. 09/187,339, entitled *Layer 2 Tunneling for Data Communications In Wireless Networks*, which is hereby incorporated by reference) allows a remote or mobile node to dial in to a home Internet Service Provider (ISP) or corporate network by making a call to a local ISP. The local ISP then forwards the call to the home ISP by tunneling PPP frames over an IP network, such as the Internet. This removes the need for a long distance call to the home ISP and removes the need for dedicated leased lines since the transport over the IP network is secure. Of course, L2TP also allows the home network the call the mobile node when the mobile node's whereabouts are known.

Layer-2 tunneling has an advantage, for example, of allowing the home network to assign an IP address to the mobile node since identification of the mobile node is done with a layer-2 address such as a telephone number. This allows private networks to assign private addresses to the mobile node for the duration of a session. Private addresses are used to save public IP addresses which are limited and require global uniqueness. Using private addresses also allows the home network to hide the internal structure of its network from the outside world by translating public addresses to private ones before delivering the packets to the mobile node inside the private network.

However, terminating traffic or packets for a mobile node cannot be delivered using layer-2 tunneling, unless location information for the mobile node is available. A normal mobile phone call to the mobile node can be used to deliver mobile terminating traffic, but this can result in undesirable long distance and roaming charges.

SUMMARY OF THE INVENTION

In accordance with embodiments of the invention, Mobile IP binding information can be used to deliver mobile terminating packets using layer-2 tunneling. When terminating packets destined for a mobile node are received by a home network for the mobile node, the Mobile IP binding is used to obtain the care-of address designating a foreign network to which the mobile node is attached. A layer-2 tunnel is created between an L2TP Network Server (LNS) in the home network and an L2TP Access Concentrator (LAC) in the foreign network, and an outgoing L2TP call is made from the home network to the foreign network. In response to the L2TP call, a call is made from the foreign network to the mobile node, and a PPP session can be established between the home network and the mobile node, via the layer-2 tunnel between the home network and the foreign network. Once the call is established the home network can optionally assign the mobile node a private IP address, and translate the home IP address labeling the terminating packets to the private IP address. E.g., the home network can re-label the terminating packets with the private IP address instead of the home IP address.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

In accordance with embodiments of the invention, Mobile IP binding information can be used to deliver packets terminating at a mobile node using layer-2 tunneling. When terminating packets destined for a mobile node are received by a home network for the mobile node, the Mobile IP binding is used to obtain a forwarding or "care-of" address that identifies a foreign network to which the mobile node is attached. A layer-2 tunnel in accordance with L2TP is created between the home network and the foreign network, and an outgoing L2TP call is made from the home network. A call is then made from the foreign network to the mobile node, and a PPP session can be established between the home network and the mobile node, via the layer-2 tunnel between the home network and the foreign network. Once the call is established, the home network can optionally assign the mobile node a private IP address, and translate the home IP addresses on the terminating packets that are received by the home network and intended for the mobile node, to the private IP address. E.g., the home network can remove the home IP address from the destination field of the IP headers of the terminating packets, and replace it with the private IP address.

The Mobile IP binding information is only used to locate the mobile node by providing an IP address identifying the foreign network to which the mobile node is connected. No layer-3 tunneling is performed. In Mobile IP, the location information contained in the binding points to the last place where the mobile node registered. Accordingly, if the mobile node moves, e.g., changes to a new point of attachment to a network, without re-registering, then the location information becomes invalid.

Figure 1:
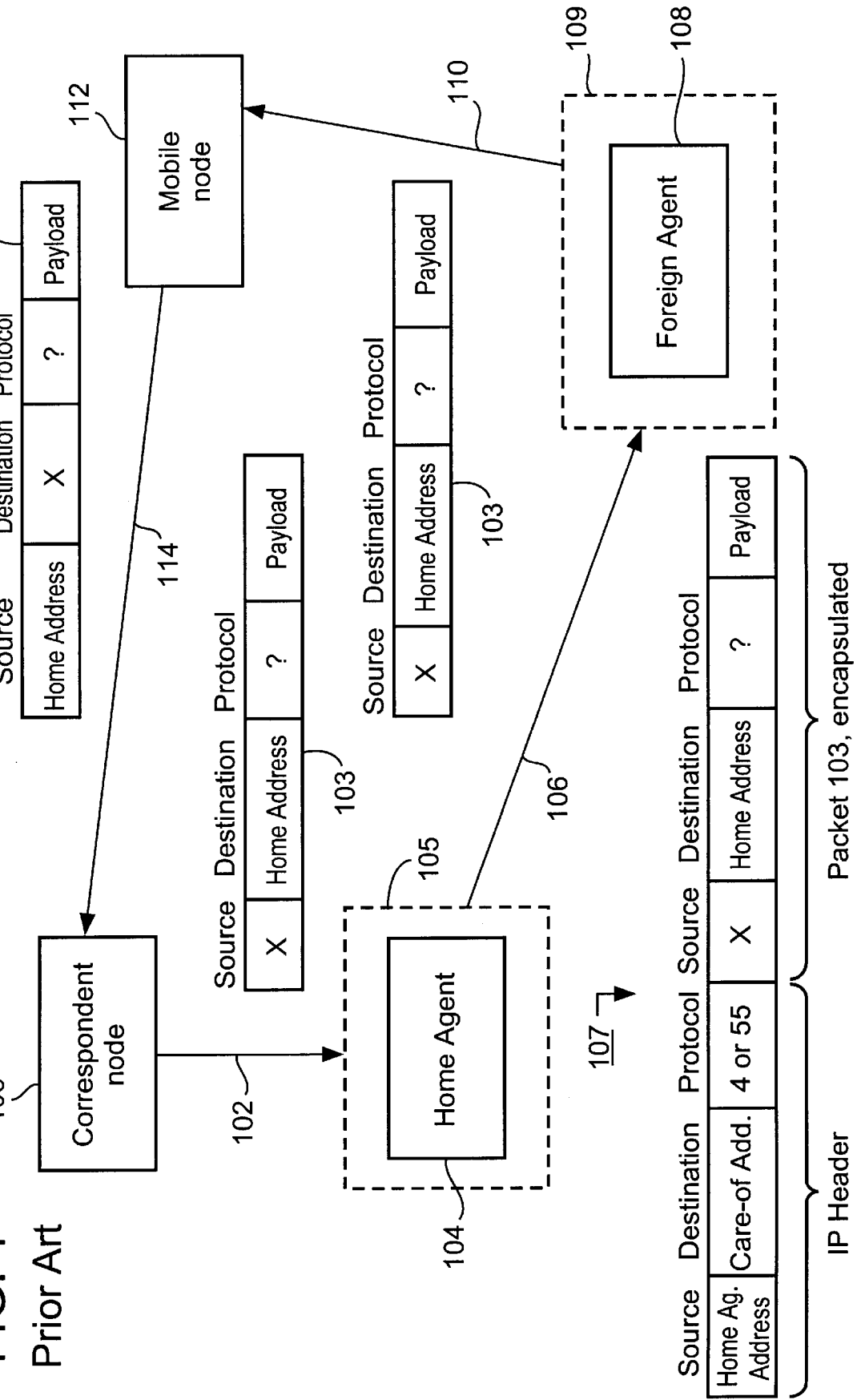
FIG. 1 shows a schematic diagram of data flow in accordance with Mobile IP.

FIG. 1 shows data flow in accordance with Mobile IP. A correspondent node sends a destination packet 103 to the home address for the mobile node 112 via a link 102. The link 102 represents an IP network such as the Internet, over which packets are routed between the correspondent node 100 and the home network 105. Network routing tables will route the packet 103 to the home agent 104 in the home network 105 according to Mobile IP. The packet 103 has a payload and an IP header that includes an IP source address X designating the correspondent node 100, and an IP home address designating the mobile node 112. The home agent 104 intercepts the packets containing the mobile node's home address. The header can also indicate a protocol. The home agent 104 encapsulates the destination packet 103 to create the packet 107, by adding an IP header that includes the IP address of the home agent 104 as the IP source address and the care-of address as the destination IP address. The home agent 104 then sends the packet 107 to the foreign agent 108 via a link 106. The link 106 represents an IP network that is intermediate between the home network and the foreign network, and through which the packet 103 tunnels as the encapsulated packet 107. The foreign agent 108 receives the packet 107, and decapsulates the packet 103 from the packet 107 by removing the IP header added by the home agent 104, thus recovering the packet 103. The foreign agent 108 then forwards the packet 103 to the mobile node 112 via a link 110. The mobile node 112 can send a packet 115 directly to the correspondent node 100 via the foreign network over a separate link 114. The link 114 can include, for example, an IP network such as the Internet.

Figure 2:
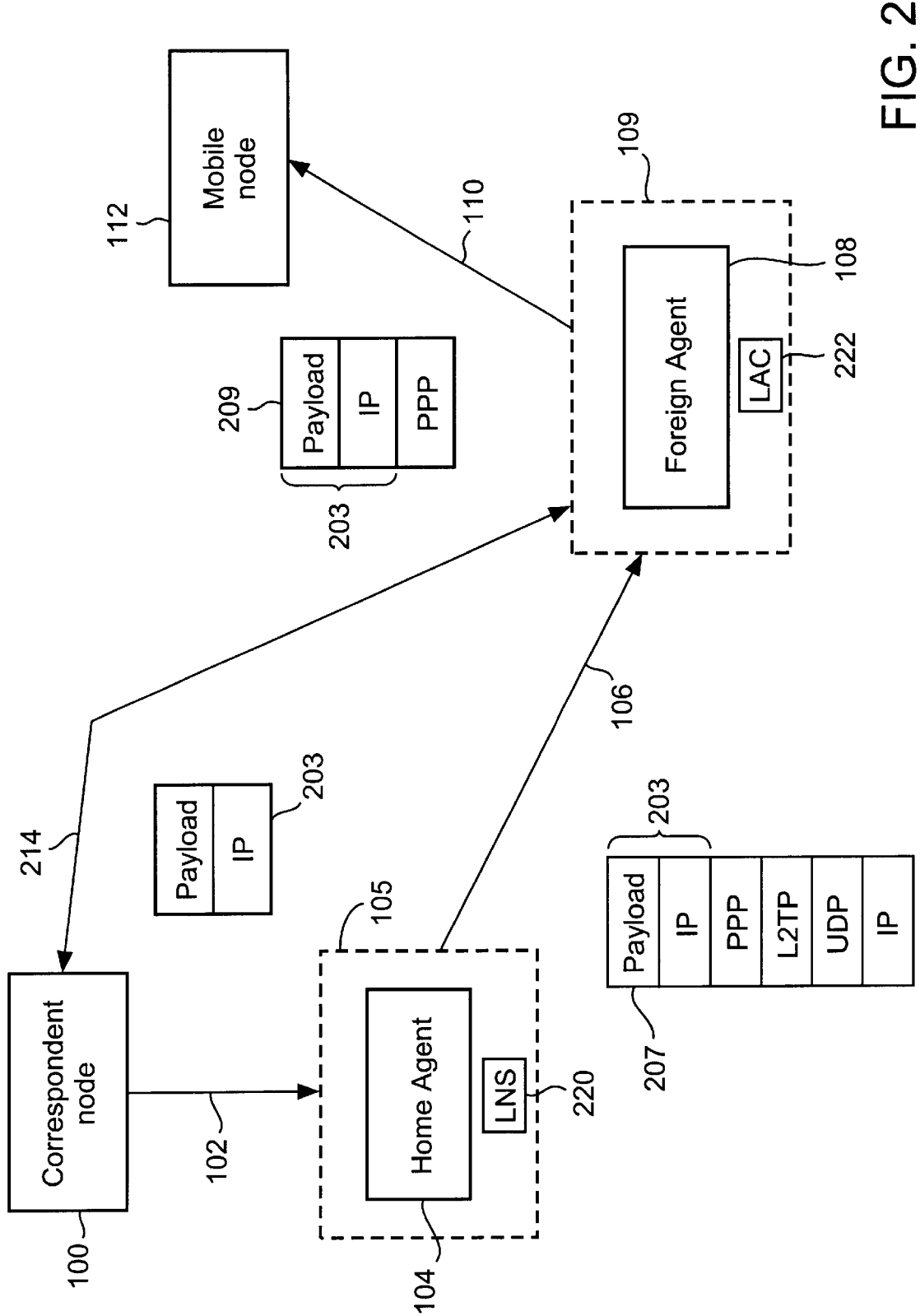
FIG. 2 shows a schematic diagram of data flow in accordance with an embodiment of the present invention.

FIG. 2 shows data flow in accordance with an embodiment of the invention. The correspondent node 100 sends a packet 203 to the mobile node 112 over the link 102 using the home address of the mobile node 112. The packet 203 shows the layers used. Since the packet 203 contains a destination IP address (the home address of the mobile node 112) that designates the home network 105, the packet 203 is forwarded to the home network. At the home network the Mobile IP binding information maintained by the home agent 104 is used to determined the care-of address for the mobile node 112, and the packet 203 is encapsulated to create the packet 207 for transmission to the mobile node 112 in accordance with L2TP. The encapsulation is done by adding a PPP layer, and then adding L2TP, UDP and IP layers in accordance with the L2TP protocol. The last-added IP layer includes a header that indicates the IP address of the home agent 104 as the source IP address, and the IP care-of address contained in the Mobile IP binding for the mobile node 112 as the destination IP address.

As the layers are added, a layer-2 tunnel is created between an L2TP Network Server (LNS) in the home network and an L2TP Access Concentrator (LAC) in the foreign network, and an outgoing L2TP call is made from the home network to the foreign network. In response to the L2TP call, a call is made from the foreign network to the mobile node, and a PPP session can be established between the home network and the mobile node, via the layer-2 tunnel between the home network and the foreign network.

In other words, after the layer-2 tunnel has been established and after the call has been made from the foreign network 109 to the mobile node 112, a PPP session can be established between the home network 105 and the mobile node 112 through the layer-2 tunnel between the home network 105 and the foreign network 109. Thereafter, terminating packets can be routed to the mobile node 112 via the PPP session and the layer-2 tunnel.

The LNS 220 can send the packet 207 to the LAC 222 via the link 106, i.e., the IP network that is intermediate between the home network and the foreign network, and through which the packet 203 tunnels as the packet 207. In accordance with the L2TP protocol, when the LAC 222 receives the packet 207, it decapsulates it by stripping the IP and UDP layers as shown by packet 209. The LAC 222 then forwards the packet 209 to the mobile node 112 via the link 110 established by the call. Thus, the LAC 222 never sees the IP header in the IP layer next to the payload, because it just transfers the IP header over the layer 2 (PPP) link to the mobile node 112. Accordingly, the home network can assign a private IP address to the mobile node 112 if desired.

The mobile node 112 can also send packets back to the correspondent node 100 by employing the same system described above, but in reverse since L2TP tunnels are bidirectional. Alternatively, the mobile node 112 can send packets directly to the correspondent node 100 via the foreign network 109. For example, a separate PPP session can be set up between the foreign network 109 and the mobile node 112, for the purposes of transferring data packets from the mobile node 112 to the correspondent node 100 by transferring the data packets from the mobile node 112 to the foreign network 109 via the separate PPP session, and then routing the data packets from the foreign network 109 to a link 214 representing, for example, an IP network such as the Internet.

For purposes of the invention, the intermediate network which the layer-2 tunnel traverses will always be IP. Or in other words, at least the layer immediately adjacent to or surrounding the layer-2 tunnel will be IP, since the intermediate network can be tunneled through another medium, and so forth recursively (tunnels within tunnels) as desirable or necessary. This same principle of tunnels within tunnels can also apply, for example, to the link 102.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A data network, comprising:
   a correspondent node;
   a mobile node; and
   a Mobile IP interface between the correspondent node and the mobile node, wherein the data network further comprises:
   a home network of the mobile node;
   a home agent within the home network;
   a Layer 2 Tunneling Protocol Network Server within the home network;
   a foreign network;
   a foreign agent within the foreign network;
   a Layer 2 Tunneling Protocol Access Concentrator within the foreign network;

a Layer 2 Tunneling Protocol interface between the Layer 2 Tunneling Protocol Network Server and the Layer 2 Tunneling Protocol Access Concentrator; and a Point to Point Protocol interface between the home network and the mobile node through the Layer 2 Tunneling Protocol interface between the Layer 2 Tunneling Protocol Network Server and the Layer 2 Tunneling Protocol Access Concentrator.

2. The data network of claim 1, wherein at least one of the home network and the foreign network is an operator's network.

3. The data network of claim 1, wherein at least one of the home network and the foreign network is an Internet Service Provider.

4. The data network of claim 1, wherein at least one of the home network and the foreign network is a corporate network.

5. A method for using Mobile IP binding information and Layer 2 Tunneling Protocol tunneling to route packets from a correspondent node to a mobile node, comprising the steps of:

receiving at a home network of the mobile node a packet from the correspondent node for routing to the mobile node through the home network, the home network corresponding to a destination address on the packet, wherein the destination address is a home address for the mobile node;

determining a care-of address corresponding to a foreign network using the home address and the Mobile IP binding information for the mobile node;

establishing a Layer 2 Tunneling Protocol tunnel between the home network and the foreign network;

making a call from the foreign network to the mobile node;

establishing a Point-to-Point Protocol session between the home network and the mobile node;

encapsulating the received packet in accordance with the Layer 2 Tunneling Protocol for transmission through the Layer 2 Tunneling Protocol tunnel from the home network to the foreign network; and sending the encapsulated packet through the Layer 2 Tunneling Protocol tunnel from the home network to the foreign network.

6. The method of claim 5, further comprising the steps of:

receiving the encapsulated packet at the foreign network;

decapsulating the received packet; and forwarding the decapsulated packet to the mobile node.

7. A method for transmitting data packets to a mobile node across at least one internetwork, comprising the steps of:

receiving at a home network of the mobile node a data packet bearing a first Internet Protocol address and intended for terminal delivery to the mobile node;

encapsulating the data packet and the first Internet Protocol address using Point to Point Protocol to create a first message capsule;

encapsulating the first message capsule with a second Internet Protocol address designating a foreign network connected to the mobile node to create a second message capsule in accordance with Layer 2 Tunneling Protocol;

forwarding the second message capsule from the home network to the foreign network via a Layer 2 Tunneling Protocol tunnel between the home network and the foreign network;

decapsulating the second message capsule at the foreign network to recover the first message capsule; and forwarding the recovered first message capsule from the foreign network to the mobile node.

8. The method of 7, further comprising the step of determining the second Internet Protocol address based on Mobile IP binding information for the mobile node.

9. The method of 7, further comprising the step of determining the second Internet Protocol address based on the first Internet Protocol address.

* * * * *